UNITED STATES PATENT OFFICE.

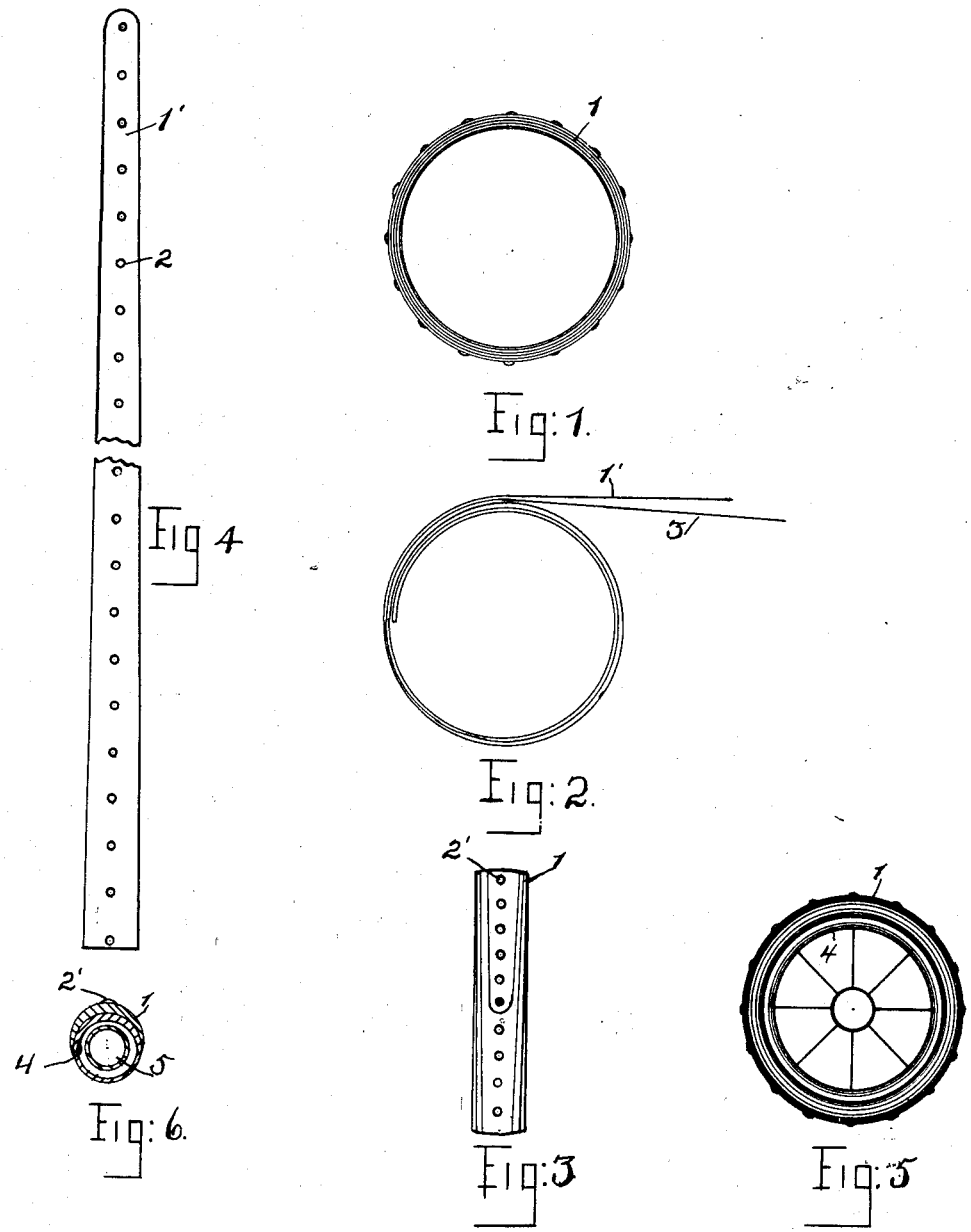

EDWARD KREBS, OF ALBANY, NEW YORK.

TIRE-SHOE.

No. 814,143.  Specification of Letters Patent.  Patented March 6, 1906.

Application filed September 12, 1905. Serial No. 278,077.

*To all whom it may concern:*

Be it known that I, EDWARD KREBS, a citizen of the United States, residing at Albany, New York, have invented certain new and useful Improvements in Tire-Shoes; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to supplemental tires or shoes, especially for use with the wheels of automobiles, a full description thereof following.

In the drawings, Figure 1 shows my supplemental tire or shoe in side elevation and ready for use; Fig. 2, a side elevation of the shoe as it is being formed, showing the relation of the parts to each other; Fig. 3, an edge or circumferential view of a finished shoe; Fig. 4, a plan view of one of the strips which forms a part of the shoe; Fig. 5, an automobile-wheel, shown in side elevation, having my supplemental tire or shoe in position thereon; and Fig. 6, a cross-section of the rubber tire and my shoe with the expansible air-tire.

My device is intended as a protection for inflatable tires of all kinds made of any easily-puncturable material and is made and formed by combining two or more superimposed strips of steel or metal tape and any elastic and compressible material, like rubber. These alternate strips of metal and resilient material are punctured, as seen at 2 in Fig. 4, 1' showing the steel strip, and 3 in Fig. 2 the strip of elastic material. These alternate strips are preferably formed into a ring by use of a mandrel, upon which they are wound, as seen in Fig. 2, and assume the shape shown in Figs. 1 and 3, and are riveted together, as seen at 2' in Fig. 3.

The numeral 1 shows the shoe as a whole when completed.

Figs. 5 and 6 show the shoe as applied to an automobile rubber tire, 1 denoting the shoe, and 4 the ordinary rubber tire, showing that the shoe encircles the tire.

In Fig. 6, 1 indicates the shoe; 2', one of the rivets; 4, the rubber outer tire, and 5 the inner inflatable tire.

My shoe is applied to the outer tire by allowing the air to escape from 5 until the tire 4 partly or entirely collapses, when my shoe 1 is slipped over the tire 4 and the tube 5 is again inflated, which causes my shoe 1 to be firmly held to the rubber or outer tire 4. The result is that glass, tacks, or other similar things cannot puncture the steel tape 1', and the resilient material 3 prevents any rattling or other noise and also leaves the shoe as a whole with plenty of resilience, so that the ordinary resilience of the outer rubber tire 4 is not appreciably diminished. The strip 3 need not be of rubber, but any other elastic or compressible substance may be used, if desired, that will accomplish practically the same end. The strips 1' and 3 are preferably tapering, one end being wider than the other, as shown in Fig. 4, the result being, when formed into a shoe, as seen in Fig. 3.

Having shown and described my invention, so that those skilled in the art may know how to make and use the same, what I desire to secure by Letters Patent and what I claim is—

1. A protecting-shoe for inflatable tires consisting of alternating layers of non-puncturable and elastic material wound upon each other forming a ring, said ring being arranged to encircle the tire, the wound strips being fastened together substantially as described.

2. A protecting-shoe for inflatable tires consisting of a metallic strip and an elastic strip superimposed by winding and fastened together forming a ring, said ring being arranged to encircle the tire and be held in place thereon substantially as described.

3. A protecting-shoe for the outer or tread surface of wheels consisting of alternating layers of non-puncturable and elastic material formed into strips wider at one end than at the other and formed into a ring by winding them and fastened together at intervals said ring being arranged to encircle the tire and be held in place thereon substantially as described.

In testimony whereof I affix my signature in presence of two witnesses.

EDWARD KREBS.

Witnesses:
W. M. BROWN,
JAS. M. BROWN.